(12) United States Patent
Perthel et al.

(10) Patent No.: US 7,722,009 B2
(45) Date of Patent: May 25, 2010

(54) ELECTROMAGNETIC VALVE

(75) Inventors: Klaus Perthel, Burscheid (DE);
Andreas Jauss, Westernohe (DE)

(73) Assignees: GM Global Technology Operations Inc., Detroit, MI (US); Klaus Pertel, Burscheid (DE)

( * ) Notice: Subject to any disclaimer, the term of this patent is extended or adjusted under 35 U.S.C. 154(b) by 577 days.

(21) Appl. No.: 10/576,717

(22) PCT Filed: Oct. 21, 2004

(86) PCT No.: PCT/EP2004/011913

§ 371 (c)(1),
(2), (4) Date: Jul. 5, 2007

(87) PCT Pub. No.: WO2005/040654

PCT Pub. Date: May 6, 2005

(65) Prior Publication Data

US 2007/0272891 A1    Nov. 29, 2007

(30) Foreign Application Priority Data

Oct. 21, 2003    (DE) ............................... 103 49 378
Dec. 31, 2003    (DE) ............................... 103 61 781

(51) Int. Cl.
*F16K 31/02*    (2006.01)
(52) U.S. Cl. .................. 251/129.15; 251/144; 137/613
(58) Field of Classification Search ................. 251/144, 251/129.15; 137/613, 505.25; 222/3
See application file for complete search history.

(56) References Cited

U.S. PATENT DOCUMENTS 2,551,501 A * 5/1951 Mitchell et al. .............. 62/50.2
4,800,948 A * 1/1989 Visnic .......................... 164/63
5,188,017 A * 2/1993 Grant et al. .................... 91/459
5,197,710 A    3/1993 Wass et al.
5,452,738 A    9/1995 Borland et al.
5,458,151 A    10/1995 Wass
5,813,429 A * 9/1998 Ohtaka et al. ............... 137/266
5,820,102 A * 10/1998 Borland ...................... 251/144
5,860,884 A * 1/1999 Jolliff ........................... 475/89

(Continued)

FOREIGN PATENT DOCUMENTS

EP    1327808    7/2003

(Continued)

*Primary Examiner*—John K. Fristoe, Jr.
*Assistant Examiner*—Marina Tietjen
(74) *Attorney, Agent, or Firm*—Muirhead and Saturnelli, LLC

(57) ABSTRACT

An electromagnetic valve for a vehicle gas cylinder, said valve comprising: a valve body; an external thread section of the valve body, that can be screwed into an internal thread on the gas cylinder; a section of the valve body protruding into the gas cylinder; a shut-off piston; and electromagnetic control elements which can be used to displace the shut-off piston from a conducting position into a closed position. The valve body comprises a cavity for receiving the shut-off piston and the control elements, said cavity being located inside the thread section and/or in the section of the valve body protruding into the gas cylinder. In order to simplify the disassembly and assembly of one such valve, the mouth of the cavity is arranged on the head end of the valve body located outside the gas cylinder. The shut-off piston and the electromagnetic control elements can be inserted into the cavity through the mouth thereof.

23 Claims, 6 Drawing Sheets

U.S. PATENT DOCUMENTS

| | | | |
|---|---|---|---|
| 6,186,168 B1 * | 2/2001 | Schultz et al. | 137/505.11 |
| 6,260,570 B1 * | 7/2001 | Wass et al. | 137/68.3 |
| 6,321,779 B1 * | 11/2001 | Miller et al. | 137/340 |
| 6,390,075 B1 * | 5/2002 | Yamazaki et al. | 123/529 |
| 6,452,099 B1 * | 9/2002 | Miller et al. | 174/652 |
| 6,495,032 B2 * | 12/2002 | Miller et al. | 210/130 |
| 6,517,615 B2 * | 2/2003 | Miller et al. | 96/421 |
| 6,557,821 B2 * | 5/2003 | Girouard et al. | 251/30.03 |
| 6,691,729 B2 * | 2/2004 | Takeda et al. | 137/74 |
| 6,834,674 B2 * | 12/2004 | Koschany et al. | 137/613 |
| 6,929,028 B2 * | 8/2005 | Larsen et al. | 137/613 |
| 7,309,113 B2 * | 12/2007 | Carter | 303/119.1 |
| 7,441,564 B2 * | 10/2008 | Larsen et al. | 137/613 |
| 2003/0066836 A1 * | 4/2003 | Sakaguchi et al. | 220/581 |
| 2003/0075700 A1 | 4/2003 | Girouard et al. | |

FOREIGN PATENT DOCUMENTS

FR  2816032  5/2002

* cited by examiner

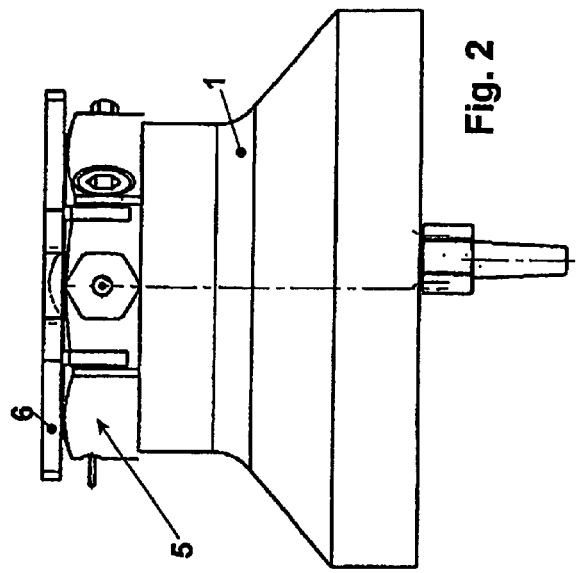
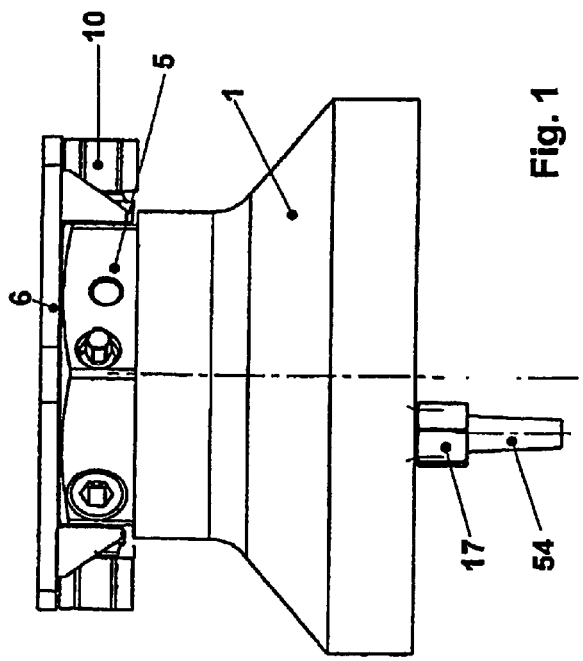
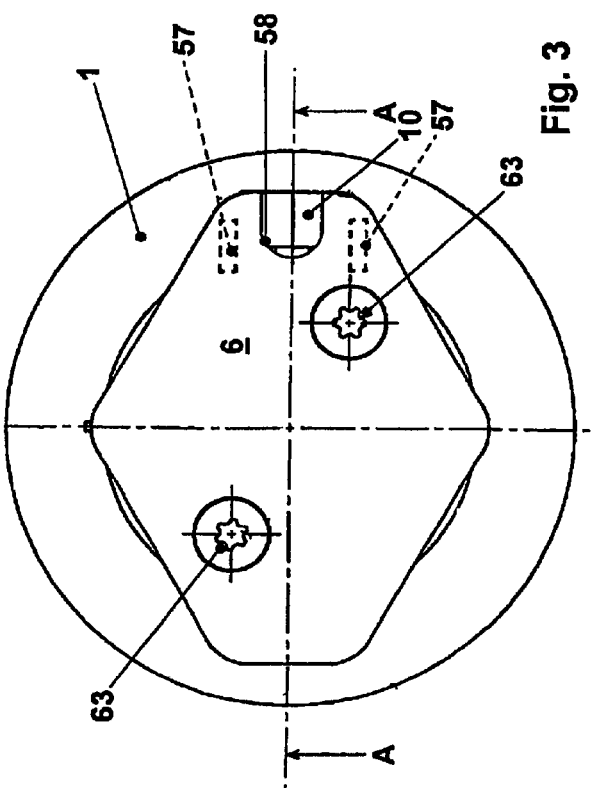

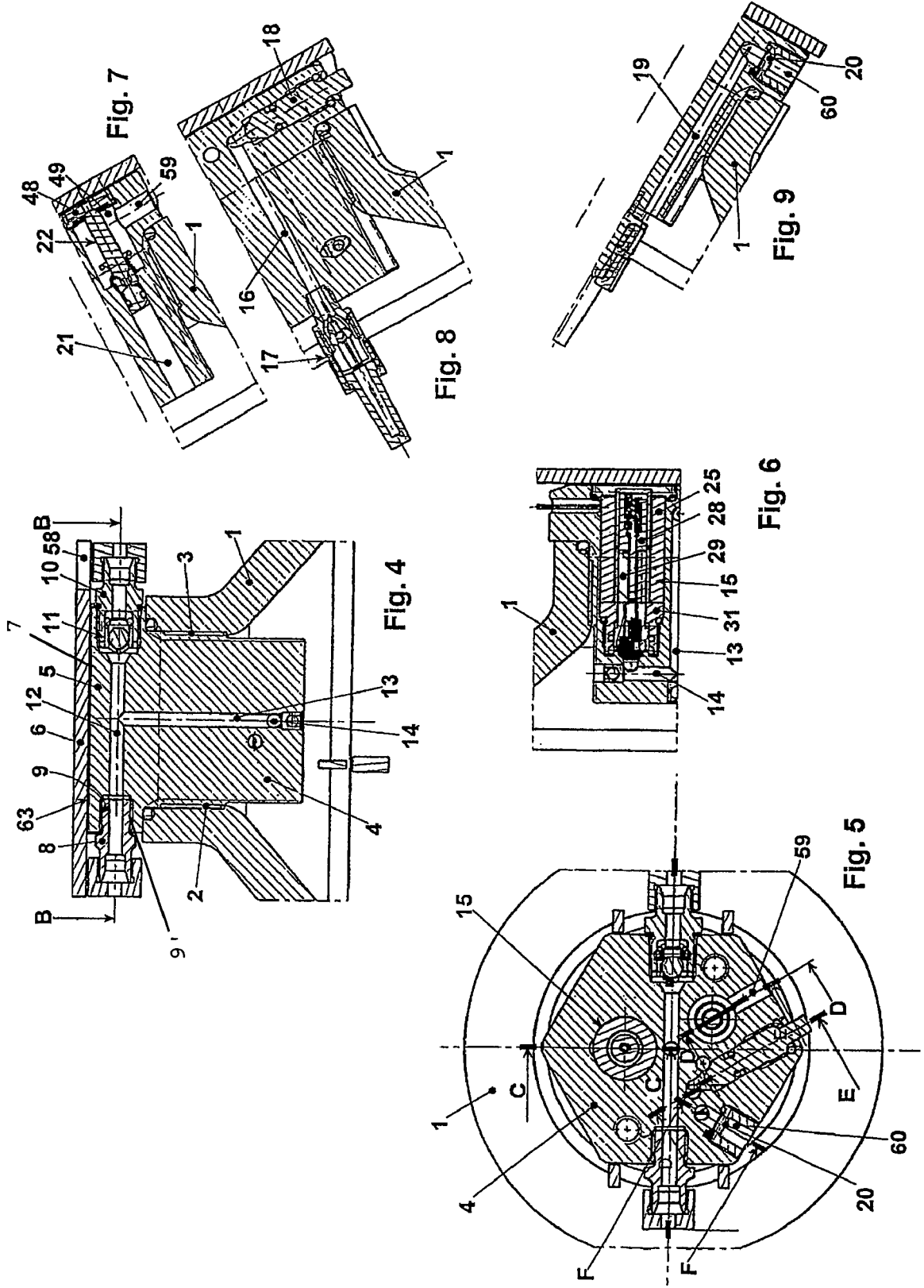

ELECTROMAGNETIC VALVE

TECHNICAL FIELD

The invention relates to an electromagnetic valve for a gas cylinder, in particular a gas cylinder for a gas-powered motor vehicle.

BACKGROUND OF THE INVENTION

Such electromagnetic valves are known for example from the printed documents U.S. Pat. No. 5,197,710, U.S. Pat. No. 5,458,151 and U.S. Pat. No. 5,452,738.

The known electromagnetically actuated valves or solenoid-actuated valves are used to control the flow of compressed gases into the gas cylinder or out of the gas cylinder. Gas cylinders for gas-powered vehicles hold the combustion gas at a pressure above atmospheric, for example between 2 and 260 bar. The said electromagnetic valves allow a bi-directional gas stream, on the one hand, during refuelling into the gas cylinder and, on the other hand, during driving mode of the engine out of the gas cylinder towards the engine. During driving mode, the gas flows from the interior of the gas cylinder at high pressure through a connection channel into the supply line to the pressure reducer, in which the pressure is reduced to the required injection pressure of the engine, e.g. 2 to 8 bar. During refuelling, the gas flows in the opposite direction from a refuelling system though the same connection channel into the gas cylinder. During the refuelling operation, the refuelling channel of the refuelling system has a high internal pressure, e.g. 200 to 260 bar. The empty gas cylinder has a lower internal pressure until it has been completely filled with gas and reaches the pressure of the refuelling system.

In addition to their function of reliably regulating the gas flow in the two different operating situations, such electromagnetic valves have to meet high safety standards. For this reason, in the cited US patents it was proposed that the cavity for receiving the shut-off piston and the electromagnetic control elements of the valve be disposed inside the threaded portion and/or the portion of the valve body projecting into the gas cylinder. The valve body is made of a relatively non-rigid material, for example brass, whereas the gas cylinder is made of very hard material, usually steel or composite material. By shifting the shut-off piston and the control elements into portions of the valve body that are situated inside the hard wall of the gas cylinder, the safety of the valve in the event of a crash, i.e. in the event of powerful impacts upon the valve owing to an accident, is dramatically increased compared to valves having functional elements situated outside of the cylinder. To disassemble the valves for maintenance or cleaning purposes, the valve body first has to be unscrewed from the gas cylinder to gain access to the functional elements of the valve, namely the shut-off piston and the control elements, from the rear of the valve body situated in the gas cylinder.

Accordingly, it is desirable to facilitate the disassembly and assembly of a valve of the described type.

SUMMARY OF THE INVENTION

According to one embodiment of the invention, a mouth of the cavity is disposed at the head end of the valve body situated outside of the gas cylinder, and the shut-off piston and the electromagnetic control elements are insertable into the cavity through the mouth.

By opening the cavity for the shut-off piston and the electromagnetic control elements towards the front, i.e. towards the end of the valve body situated outside, these components may be disassembled and assembled while the valve body is screwed in the gas cylinder. This substantially facilitates the maintenance and cleaning work at such valves. There is no need to remove the valve body from the gas cylinder in order to disassemble the functional elements of the valve. As a result, the time needed for maintenance and cleaning is dramatically reduced. The fact that the valve body is not removed from the gas cylinder during maintenance work means that the connection between valve and gas cylinder need not be tested for leaks afterwards.

In the region of the mouth of the cavity it is possible in practice to dispose an external thread, into which a screw cap may be screwed. The screw cap seals off the cavity from the environment and prevents dirt and moisture from penetrating into the cavity and the functional elements of the electromagnetic valve accommodated therein.

In practice, the cavity may have at the bottom end an internal thread, into which an external thread of a sleeve of the valve is screwable. Disposed inside the sleeve is the shut-off piston with further functional elements of the valve as well as the externally electromagnetically adjustable armatures and further control elements of the electromagnetic valve. The upper portion of the sleeve is designed in the shape of a cylinder envelope. After assembly of the sleeve, a coil is slipped onto a cylinder-envelope-shaped portion of the sleeve inside the cavity. The coil actuates the electromagnetic control elements, i.e. the armatures. The screw cap protects the screwed-in sleeve and the coil from moisture and soiling.

Electromagnetic valves, e.g. according to ECE R110, in practice have further elements. Such elements are for example a manual shut-off valve, which may be used to interrupt the gas flow through the electromagnetic valve independently of the control status thereof. Further provided are connecting pieces, which have a non-return valve if these are provided for connection to the refuelling system. Such a non-return valve prevents the reflux of the gas from the gas cylinders through the connector for the refuelling system in the event of a crash and after removal of the tank fitting. A further connecting piece without a non-return valve may be provided for connecting the gas cylinder to the engine or to further gas cylinders on the vehicle.

Of particular importance are safety elements on the valve. First of all, a pressure relief device with a rupture diaphragm should be provided. Such a pressure relief device allows the gas to flow out in a situation where the internal pressure of the gas cylinder has reached a critical value. For example, in the event of a fire, the gas in a gas cylinder may heat up to such an extent that the cylinder threatens to explode. In such a situation, it is preferable to discharge the gas in a controlled manner in order to avoid an explosion. Thermal safety elements may further be provided. Such safety elements generally comprise fluid-filled glass bodies. The glass bodies burst when the temperature of the liquid in the glass body exceeds a critical value. Such a safety element prevents the gas cylinder from exploding in the event of softening of the outer skin thereof due to extreme heat.

In a practical embodiment of the valve according to the invention, the valve body has at least one receiving space for a further element, which may be one of the elements described above. The receiving space has an opening outside of the gas cylinder, through which opening the further element is insertable. This then allows the said further element, like the valve itself, to be fitted and removed and hence maintained and cleaned while the valve body is screwed in the gas cylinder.

In order to allow gas to flow out of or into the cylinder interior through the cavity in the valve body, in which the shut-off piston and the control elements are disposed, the valve body preferably has at least one flow channel connecting the cavity to at least one connection opening outside of the gas cylinder. Coupling pieces are preferably disposed on the connection opening and connectable to an efflux line and/or afflux line. Particularly for the connection of an afflux line by a refuelling system, the coupling piece may be provided with a non-return valve. As the connection openings are situated likewise outside of the gas cylinder, such coupling pieces are also detachable and attachable while the valve body is fitted permanently in the gas cylinder.

In practice, the valve body may further comprise at least one flow channel connecting the cavity to a mouth into the interior of the gas cylinder. The valve body may additionally comprise at least one flow channel connecting the at least one receiving space to a mouth into the interior. This is necessary for example when the receiving space contains a safety element that is to bring about the controlled discharge of the gas from the interior.

In practice, a flow restrictor may be disposed on the mouth into the interior of the gas cylinder. The flow restrictor has a closure body, which is displaceable counter to a spring force. Given an atypically high pressure difference between the front and the rear of this closure body, the rate of efflux from the gas cylinder is reduced to such an extent that for example hazardous flame formation outside of the gas cylinder is avoided or reduced. In one embodiment, all of the flow channels leading to the interior of the gas cylinder may be connected to the same mouth. The flow restrictor in said case acts equally to restrict the flow in the event of damage to a line supplying the gas to the engine. If, when the safety elements are triggered, an unimpeded discharge of the cylinder contents is desired, the safety elements may alternatively be connected by separate channels without a flow restrictor to the interior of the gas cylinder.

A filter may likewise be disposed on the mouth into the interior of the gas cylinder. Preferably, both a filter and a flow restrictor are disposed on the mouth. It is in fact assumed that gas flowing into and out of a gas cylinder is free of impurities. However, experience gained from continuous operation shows that impurity particles and corrosion particles may lead to contamination. Such impurities may be removed from the gas stream by the said filter.

In a practical embodiment, the head end of the valve body situated outside of the gas cylinder is covered by a hard protective plate. The protective plate may be made of the same material as the gas cylinder. This is usually steel. In this way, the protective plate protects the valve body in regions where it is not surrounded by the casing or the threaded portion of the gas cylinder.

In practice, the head end of the valve body may have rounded edges. In the region of the rounding of the edges, a small gap arises between the head end of the valve body and the protective plate. This allows a spring deflection of the protective plate in the event of an impact upon its edge. The protective plate, in the region of connections of the valve body, may moreover have support ribs that abut against the head end of the valve body. This increases the protective effect of the protective plate for the connections that protrude from the valve body. Also, in the region of at least one connection a cutout may be disposed in the protective plate to provide improved access e.g. for a screwing tool. Particularly in the case of the support ribs, the protective plate regions laterally of the cutout are strong enough to protect the connection from impacts.

An elastic layer may be disposed between the protective plate and the head end of the valve body. The elastic layer in practice is made for example of a thermoplastic polymer, in particular a rubber-like material. The elastic layer, on the one hand, protects the head end of the valve body from soiling and moisture and, on the other hand, effects damping between the protective plate and the head end. The damping reduces the effect of impacts against the valve body.

In practice, the head end of the valve body may be designed as a polygon, in particular a quadrilateral or hexagon. This allows the application of a screwing tool for screwing the valve body into the internal thread of the gas cylinder.

When the gas cylinder is fitted on a motor vehicle with a passenger compartment, the efflux openings of the safety elements should as far as possible be disposed on the side of the valve body remote from the passenger compartment. In an emergency situation, in which a gas discharge is triggered by one of the safety elements, the flammable gas is thereby prevented from flowing directly towards the passenger compartment.

The invention further relates to an electromagnetic valve for a gas cylinder, in particular a gas cylinder for a gas-powered motor vehicle engine.

Such a valve is known for example from the European patent application EP 1 327 809 A1. Here, the shut-off piston is pressed by means of a closing spring, which is supported against the valve body, with its main seal against the main seal seat. Upon opening of the pilot seal by the electromagnetic control elements, a flow is allowed through the pressure reduction channel in the shut-off piston.

During driving mode, the front mouth of the pressure reduction channel situated at the bottom is connected to the low-pressure side, i.e. to the supply lines to the engine. At the rear of the shut-off piston a high pressure prevails, which arises from a connection to the annular space, which is connected to the high-pressure region in the gas cylinder. Upon opening of the pressure reduction channel, the high pressure suddenly drops. The volumetric flow through the connection of the annular space to the rear of the piston is smaller than the volumetric flow that is able to flow off through the pilot seat.

Upon opening of the pressure relief channel, because of the pressure difference between the high pressure in the annular space and the low pressure, which arises at the rear of the piston and corresponds substantially to the pressure of the efflux through the connection channel, a force for opening the shut-off piston arises and presses the shut-off piston in the cited prior art counter to the action of the closing spring away from the main seal seat.

During refuelling, on the other hand, the greatest pressure arises in the region of the connection channel, which is connected to the refuelling system. During refuelling, this pressure opens the shut-off piston generally without electromagnetic actuation of the pilot organs and fills the cylinder until the internal pressure in the cylinder corresponds to the pressure of the refuelling system. Here, instabilities have been observed because of the closing spring between shut-off piston and valve body. In specific refuelling situations, the pressure difference is insufficient to overcome the force of the closing spring. In this case, the closing spring presses the piston into the main seal seat and blocks the gas flow. Dynamic flow effects then cause the pressure in the middle region to increase up to the pressure of the refuelling system.

When this pressure exceeds a specific limit value, the shut-off piston re-opens. These periodic operations may lead to unpleasant noise generation.

Accordingly, in another aspect, the present invention provides an electromagnetic valve of the described type, which reduces or eliminates the described instabilities. In another embodiment, the shut-off piston is disposed in a substantially freely displaceable manner in the valve body and it is exclusively the pretension spring for the pilot seal that develops a pretension force that presses the shut-off piston against the main seal seat.

The pretension force of the pretension spring for the pilot seal is significantly lower than the force of the closing spring of the prior art. The reliable opening and closing of the shut-off piston is achieved substantially by fluid dynamic effects.

The pressure reduction channel preferably opens out via small flow channels at the front of the shut-off piston close to the main seal seat. In this region, when the shut-off piston is open, the smallest flow cross section and hence the highest rate of flow occurs. As the rate of flow decreases again from this region towards the connection channel, which has a larger cross section, in the said region with the highest rate of flow the static pressure is at its lowest. Because of this fluid dynamic increase of the vacuum at the mouth of the pressure reduction channel, the pressure difference between the front and the rear of the shut-off piston is increased and a reliable opening is effected when the pilot seal releases the pressure reduction channel.

BRIEF DESCRIPTION OF THE DRAWINGS

There now follows a description of forms of construction of the invention with reference to the accompanying drawings. The drawings show in:

FIG. 1 a side view of an upper cylinder portion with a screwed-in electromagnetic valve, FIG. 2 a front view of the arrangement of FIG. 1, FIG. 3 a plan view of the arrangement of FIG. 1, FIG. 4 a sectional view of the arrangement along the section line A-A in FIG. 3, FIG. 5 a sectional view along the section line B-B of FIG. 4, FIG. 6 a sectional view of the electromagnetic valve along the section line C-C in FIG. 5, FIG. 7 a sectional view of the thermal safety arrangement along the section line D-D in FIG. 5, FIG. 8 a sectional view of a manual shut-off valve along the section line E-E in FIG. 5, FIG. 9 a sectional view of a pressure relief element with rupture diaphragm along the section line F-F in FIG. 5, FIG. 10 a detail of the valve body with shut-off piston and electromagnetic control elements disposed thereon in a sectional view, FIG. 11 a reduced representation of the assembled parts of the electromagnetic valve of FIG. 10 in side view, FIG. 12 an enlarged view of the individual parts of the thermal safety element of FIG. 7, FIG. 13 a diagrammatic view of the individual parts of the thermal safety element of FIG. 12, FIG. 14 a sectional view of a flow restrictor and FIG. 15 the side view of the flow restrictor of FIG. 14, FIG. 16 a side view of a coupling piece with non-return valve, FIG. 17 a sectional view of a coupling piece with non-return valve and FIG. 18 the diagrammatic view of the coupling piece of FIGS. 16 and 17.

DETAILED DESCRIPTION OF VARIOUS EMBODIMENTS OF THE INVENTION

Figures 10, 11:
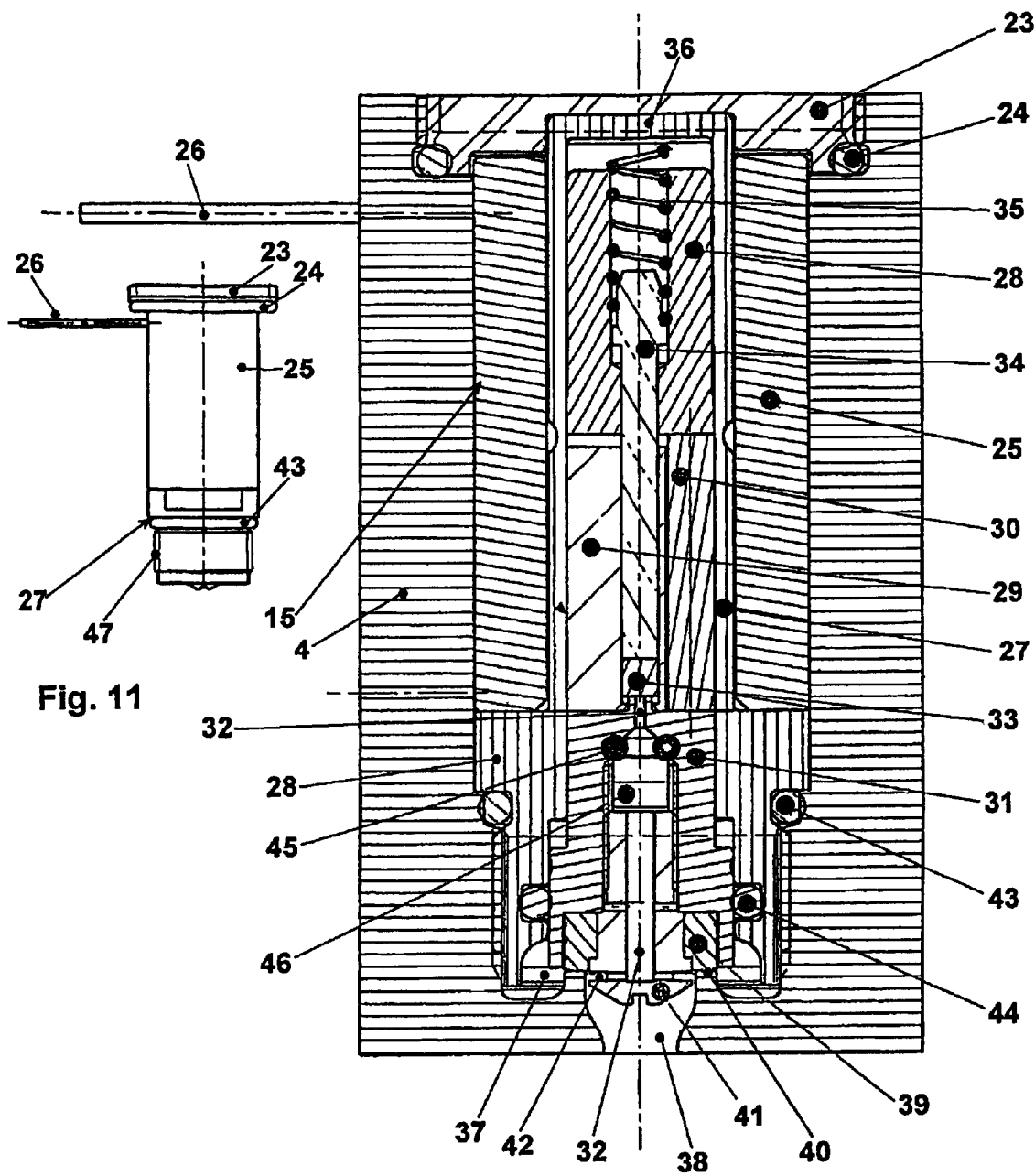

FIGS. 1 to 4 show the upper portion of a gas cylinder 1, in the cylinder neck of which an internal thread 2 is disposed for receiving an external thread 3 on a valve body 4 (see FIG. 4). The head end 5 of the valve body 4 situated outside of the gas cylinder 1 may be seen in FIGS. 1, 2 and 4. It is covered by a protective plate 6 made of steel. The valve body 4 itself, in the present case, is made of brass. The protective plate 6 is fastened by fastening screws 63 (FIG. 3) to the valve body 4. Situated between the protective plate 6 and the head end 5 of the valve body 4 is an elastic layer 7 of plastics material. The elastic layer 7 damps impacts upon the protective plate 6 and seals off the head end 5 of the valve body 4 from moisture.

As may be seen in particular in FIGS. 4 and 5, all of the openings for receiving spaces and the mouth of the cavity 15 for the shut-off piston and the electromagnetic control elements of the valve are situated in the region of the head end 5 of the valve body 4. Thus, the coupling piece 8 without a non-return valve is screwed into a receiving space 9 provided with an internal thread 9' at the head end 5 of the valve body 4. The coupling piece 8 without a non-return valve is used for the connection to the engine or to a further gas cylinder 1. The coupling piece 10 in the opposite receiving space 11 has a non-return valve and is used for the connection to a refuelling system. Situated in the region of the coupling pieces 8, 10 are openings of flow channels 12, 13, 14, which are connected to the cavity 15 for receiving the electromagnetic control elements 25, 28, 29 and the shut-off piston 31. A further flow channel 16 connects the electromagnetic valve via a flow restrictor 17 to the interior of the gas cylinder 1. A manually actuable shut-off valve 18 is disposed in the flow channel 16 to the flow restrictor 17 inside the gas cylinder 1. By means of a suitable turning tool this manual shut-off valve 18 may be closed, thereby interrupting the gas flow to the cavity 15. Further flow channels 19 lead from the interior of the gas cylinder 1 to a pressure relief element in the form of a rupture diaphragm 20, which bursts in the event of an excessively high pressure inside the gas cylinder 1. A flow channel 21 likewise leads from the interior of the gas cylinder 1 to the thermal safety device 22.

The mode of operation of the electromagnetic valve is apparent in particular from FIG. 10. The functional elements of the valve are inserted into the cavity 15 inside the valve body 4. The cavity 15 is closed by means of a screw cap 23, which is screwed into an internal thread on the upper end of the cavity 15 and sealed by means of a sealing ring 24. The coil 25 for actuating the electric valve is inserted in the cavity 15. The coil 25 is connected by a connection cable 26 to a non-illustrated power source. Extending inside the coil 25 is a sleeve 27, the bottom foot portion of which is screw-connected to the lower portion of the cavity 15. The upper portion of the sleeve 27 is cylinder-envelope-shaped and surrounds two armatures 28, 29.

The first armature 28 is supported via a distance piece 30 against a shut-off piston 31, which is disposed displaceably inside the sleeve 27. At the head end, there is situated in the centre of the shut-off piston 31 a pressure reduction channel 32, the upper opening of which forms a pilot opening. Lying against the pilot opening is a pilot seal 33, which is pressed by a plunger 34 against the pilot opening by means of a spring 35, which is supported against the upper cover wall 36 of the sleeve 27.

The closed state of the valve shown in FIG. 10 prevails when there is no current applied in the coil. When current is applied to the coil, the armature 29 is lifted and takes the pilot seal 33 with it. This releases the flow through the pressure reduction channel 32 and allows the opening movement of the shut-off piston 31 for the controlled removal of gas during driving mode.

The annular space 37, which is delimited partly by the outer annular surface of the shut-off piston 31 and partly by the lower portion of the sleeve 27, is connected to the interior of the gas cylinder 1. Furthermore, gaps and bores in the valve arrangement provide a connection of the annular space 37 to the space inside the sleeve 27 that is situated above and at the rear of the shut-off piston 31. The connection channel 38 in front of the central region of the piston 31 is connected by flow channels to the engine and has a relatively low pressure.

In order to open the connection between the annular space 37 and the connection channel 38, the piston 31 has to be lifted. Thus, a main seal 39 on the piston 31 is moved away from a main seal seat 40 in the valve body 4 and a flow cross section is opened between main seal 39 and main seal seat 40. The main seal 39 is fastened to the piston 31 by means of a seal holder 41 screw-fastened to the piston 31. The seal holder 41 is penetrated by the lower portion of the pressure relief channel 32. The pressure relief channel 32 opens outwards at the periphery of the head of the seal holder 41 via two flow channels 42 of small cross section. It may be seen that, when the shut-off piston 31 is open, the flow channels 42 of small cross section lie close to the smallest cross section between the annular space 37 and the connection channel 38. In this region the rate of flow is at its highest and consequently the static pressure is at its lowest. When the shut-off piston 31 is closed, the low pressure of the supply line to the engine prevails in the connection channel 38. At the rear of the shut-off piston 31, i.e. at the side of the shut-off piston 31 facing the armatures 28, 29, via the previously mentioned gaps the high pressure in the gas cylinder 1 and in the annular gap 37 builds up. The pressure difference between this high pressure and the low pressure in the connection channel 38 leads to the shut-off piston 31 being pressed into its illustrated closed position.

When the pressure reduction channel 32 is opened through lifting of the pilot seal 33 by means of the movable armature 29, the high pressure flows from the rear of the shut-off piston 31 through the pressure reduction channel 32 into the connection channel 38. The narrow gaps and bores only allow gas to flow slowly out of the annular space 37 towards the rear of the shut-off piston 31, so that the pressure here, when the pressure reduction channel is open, corresponds substantially to the low pressure in the flow cross section between main seal 39 and main seal seat 40. The pressure above atmospheric in the annular space 37, which communicates with the interior of the gas cylinder 1, presses the shut-off piston 31 into its upper open position. This releases the said flow cross section between the main seal 39 and the main seal seat 40. As already mentioned, by virtue of the flow rate and the deflection of the flow the pressure in the region of the mouths of the efflux channels 42 is additionally reduced, with the result that the pressure at the rear of the shut-off piston 31 drops further. The shut-off piston 31 therefore remains in its open position when the pressure reduction channel 32 is open.

For closure, the pilot seal 33 need merely, through de-excitation of the coil 25, be pressed once more by means of the pretension spring 35 against the mouth of the pressure reduction channel 32. The flow of gas from the rear to the front of the shut-off piston 31 is interrupted, and via the previously mentioned gaps the high pressure from the annular space 37 and the interior of the gas cylinder 1 may build up at the rear of the piston 31. The pressure difference compared to the low pressure in the connection channel 38 drives the piston 31 into its closed position. Further seals 43 to 45 are provided for preventing uncontrolled gas flows. In the pressure reduction channel 32 a filter 46 is provided, which prevents soiling of the electromagnetic control elements at the rear of the shut-off piston 31.

During refuelling, flow through the arrangement occurs in the opposite direction. In said case, the coil 25 is generally de-excited, i.e. no current is applied, and the shut-off piston 31 is in its closed position. Inside the gas cylinder 1 only a slight pressure above atmospheric prevails. There is attached from outside a refuelling connection, which feeds gas at high pressure to the connection channel 38. The high pressure above atmospheric of this gas pushes the shut-off piston 31 into its open position. In contrast to the prior art—with the exception of the low spring force of the spring 35 for closing the pilot seal 33—no mechanical closing force acts upon the shut-off piston 31. It is therefore pressed into its open position as soon as there is a slight pressure above atmospheric inside the connection channel 38. At this moment, gas from the refuelling system may flow via the connection channel 38 through the annular space 37 into the gas cylinder. As there is no considerable mechanical closing force counteracting the opening of the shut-off piston 31, unstable states, in which such a closing force during refuelling moves the shut-off piston into the closed position, are avoided. The throttle effect at the efflux channel 42 leads to a high pressure difference between the connection channel 38 and the space above the seal 44.

FIG. 11 shows a side view of the screw cap 23 with sealing ring 24, coil 25 and the lower portion of the sleeve 27 with further sealing ring 43 and external thread 47.

Figure 12:
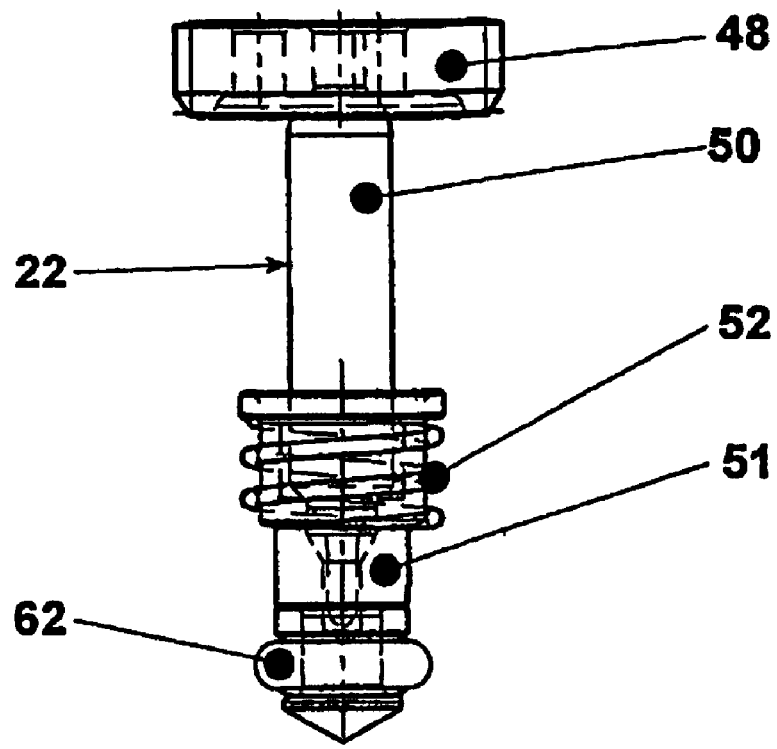
Figure 13:
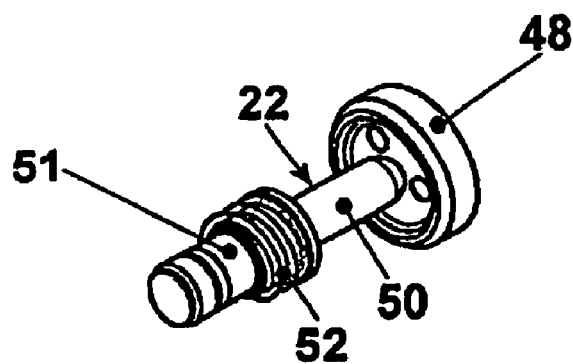

FIGS. 12 and 13 show the individual parts of the thermal safety device 22. This comprises a cover 48, which is screwed into a thread in a receiving space 49 of the valve body 4 (see FIG. 7). The cover 48 presses against a glass body 50. The glass body 50 holds a closing piston 51 in a closed position, particularly when the gas passes through the pilot seat into the space above the shut-off piston. As FIG. 7 reveals, in the closed position the lower portion of the closing piston 51 is situated in the flow channel 21 and seals off said flow channel by means of the sealing ring 62 (FIG. 12).

The glass body 50 is filled with a liquid and bursts in the event of overheating. At this moment, the flow channel 21 opens (see FIG. 7) to allow the gas to escape from the gas cylinder 1.

The efflux opening 59 of the thermal safety device may be seen in FIG. 5. It is situated, like the efflux opening 60 of the safety element with rupture diaphragm 20, on the lower part of the periphery of the head end 5 of the valve body. The valve body 4 with the gas cylinder 1 is fitted below the passenger compartment (not shown) of a vehicle so that both efflux openings 59, 60 lie at the side remote from the passenger compartment.

Figure 14:
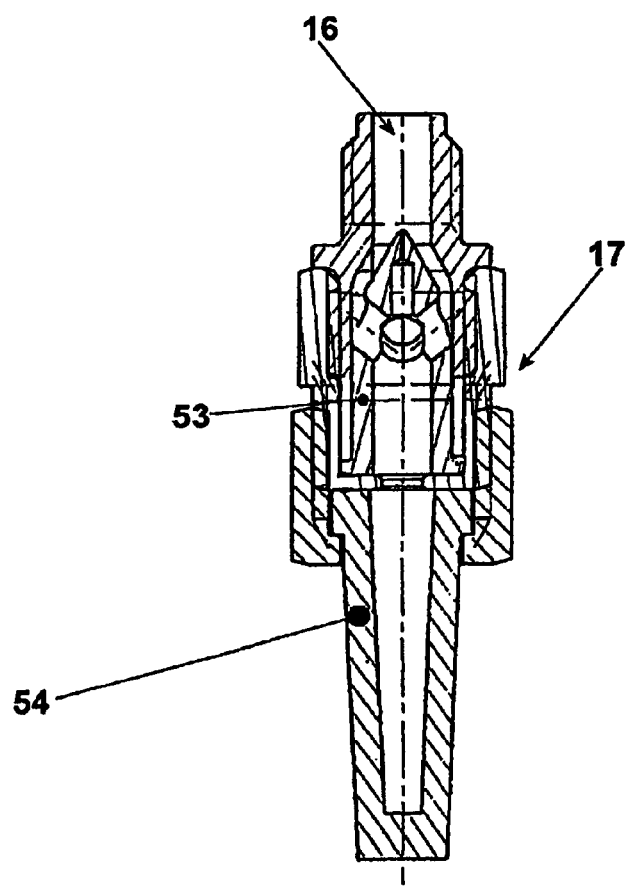
Figure 15:
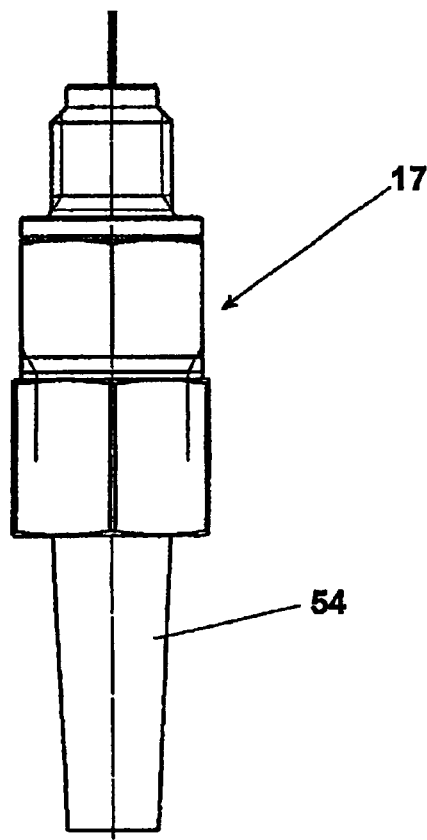

FIGS. 14 and 15 show a known flow restrictor 17, which is fitted on the mouth of the flow channel 16 (cf. FIG. 8). The flow restrictor 17 by means of a blocking body 53 has the effect that, in the event of a large pressure difference between the flow channel 16 and the interior of the gas cylinder 1, the gas quantity flowing out is reduced by means of the blocking body 53. A filter 54 is additionally provided, which prevents impurities from flowing into the flow channel 16. In an alternative embodiment, the filter 54 may no longer apply.

Figure 16:
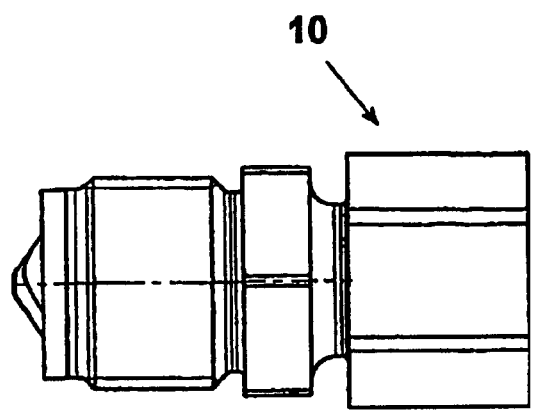
Figure 17:
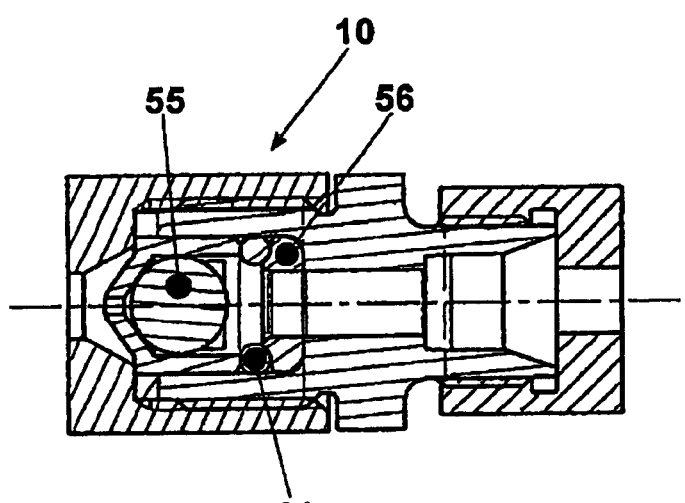
Figure 18:
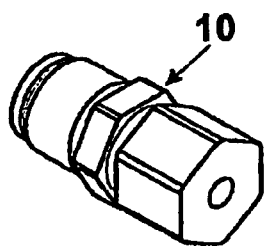

FIGS. 16 to 18 show a coupling piece 10 with non-return valve. The non-return valve may be seen in particular in the sectional view of FIG. 17. It is used to connect the refuelling connection to the gas cylinder 1. The non-return valve has substantially two active elements, namely a spherical blocking body 55 and a seat 56 for the blocking body 55.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. Electromagnetic valve for a gas cylinder, comprising:
  a valve body;
  a threaded portion of the valve body with an external thread, which is screwable into an internal thread on the gas cylinder;
  a portion of the valve body projecting into the gas cylinder;
  a shut-off piston;
  electromagnetic control elements by which the shut-off piston is movable from an open position to a closed position, wherein the valve body for receiving the shut-off piston and the electromagnetic control elements has a cavity which is disposed inside at least one of: the threaded portion and the portion of the valve body projecting into the gas cylinder, and wherein a mouth of the cavity is disposed on a head end of the valve body situated outside of the gas cylinder, and the shut-off piston and the electromagnetic control elements can be inserted into the cavity through the mouth; and
  a manual shut-off valve for interrupting gas flow from the gas cylinder to the cavity.

2. Electromagnetic valve according to claim 1, wherein disposed in a region of the mouth of the cavity is an external thread into which a screw cap is screwable.

3. Electromagnetic valve according to claim 1, wherein the valve body has at least one further receiving space for a further element, and wherein the further element can be inserted into the receiving space through an opening situated outside of the gas cylinder.

4. Electromagnetic valve according to claim 3, wherein the further element is at least one of the following elements:
  a connection coupling without a non-return valve,
  a connection coupling with a non-return valve,
  a safety element with rupture diaphragm for protecting against excessively high pressure,
  a safety element with a fluid-filled glass body for thermal protection,
  and any combination thereof.

5. Electromagnetic valve according to claim 4, wherein the gas cylinder is attached to a motor vehicle with a passenger compartment, wherein the valve comprises a plurality of safety elements which have an efflux opening situated outside of the gas cylinder, and wherein all of the efflux openings are disposed on the valve body at a side remote from the passenger compartment.

6. Electromagnetic valve according to claim 1, wherein the valve body has at least one flow channel connecting the cavity to at least one coupling piece outside of the gas cylinder.

7. Electromagnetic valve according to claim 1, wherein the valve body comprises at least one flow channel connecting the cavity to a mouth into the interior of the gas cylinder.

8. Electromagnetic valve according to claim 7, wherein a flow restrictor is disposed on the mouth into the interior of the gas cylinder.

9. Electromagnetic valve according to claim 1, wherein the valve body comprises at least one flow channel connecting at least one receiving space to a mouth into the interior of the gas cylinder.

10. Electromagnetic valve according to claim 9, wherein a flow restrictor is disposed on the mouth into the interior of the gas cylinder.

11. Electromagnetic valve according to claim 1, wherein a filter is disposed on a mouth into the interior of the gas cylinder.

12. Electromagnetic valve according to claim 1, wherein a protective device against mechanical actions is provided on the head end of the valve body situated outside of the gas cylinder.

13. Electromagnetic valve according to claim 12, wherein the protective device is a protective plate.

14. Electromagnetic valve according to claim 13, wherein the protective plate has at least one support rib.

15. Electromagnetic valve according to claim 13, wherein an elastic layer is disposed between the protective plate and the head end of the valve body.

16. Electromagnetic valve according to claim 15, wherein the elastic layer is made of a thermoplastic polymer.

17. Electromagnetic valve according to claim 12, wherein the head end of the valve body has rounded or chamfered edges.

18. Electromagnetic valve according to claim 1, wherein the head end of the valve body is designed as a polygon.

19. Electromagnetic valve according to claim 18, wherein the polygon is a quadrilateral or hexagon.

20. Electromagnetic valve for a gas cylinder, comprising:
  a valve body;
  a threaded portion of the valve body with an external thread, which is screwable into an internal thread on the gas cylinder;
  a portion of the valve body projecting into the gas cylinder;
  a shut-off piston;
  electromagnetic control elements by which the shut-off piston is movable from an open position to a closed position, wherein the valve body for receiving the shut-off piston and the electromagnetic control elements has a cavity which is disposed inside at least one of: the threaded portion and the portion of the valve body projecting into the gas cylinder, and wherein a mouth of the cavity is disposed on a head end of the valve body situated outside of the gas cylinder, and the shut-off piston and the electromagnetic control elements can be inserted into the cavity through the mouth; and
  a protective device against mechanical actions provided on the head end of the valve body situated outside of the gas cylinder, wherein the protective device is a protective plate, wherein the protective plate has at least one support rib, and wherein disposed in the protective plate is at least one cutout which is situated close to the at least one support rib.

21. Electromagnetic valve, comprising:
  a valve body, wherein said valve body includes an attachment mechanism and a projection portion that projects into a gas cylinder;
  a shut-off piston;
  electromagnetic control elements that control movement of the shut-off piston from an open position to a closed position, wherein the valve body includes a cavity disposed in the projection portion, and wherein a mouth of the cavity is disposed on a head end of the valve body distal from the projection portion, and wherein the shut-off piston and the electromagnetic control elements are disposed in the cavity and are externally accessible through said mouth of the cavity; and a manual shut-off valve for interrupting gas flow from the gas cylinder to the cavity.

22. Electromagnetic valve according to claim 21, wherein the shut-off piston is disposed in a substantially freely displaceable manner in the valve body.

23. Electromagnetic valve according to claim 22, further comprising:

a pressure reduction channel in the shut-off piston, wherein the pressure reduction channel connects a rear of the shut-off piston facing the electromagnetic control elements to a front of the shut-off piston.

\* \* \* \* \*

UNITED STATES PATENT AND TRADEMARK OFFICE
CERTIFICATE OF CORRECTION

PATENT NO. : 7,722,009 B2 Page 1 of 1
APPLICATION NO. : 10/576717
DATED : May 25, 2010
INVENTOR(S) : Klaus Perthel and Andreas Jauss It is certified that error appears in the above-identified patent and that said Letters Patent is hereby corrected as shown below:

Title page,
Item (73) Assignee section the inventor name should be corrected to read "Klaus Perthel".

Signed and Sealed this

Twenty-seventh Day of July, 2010

David J. Kappos
*Director of the United States Patent and Trademark Office*